United States Patent
Pearce

(10) Patent No.: US 9,185,182 B2
(45) Date of Patent: Nov. 10, 2015

(54) DETERMINING A PROPERTY OF A COMMUNICATION DEVICE

(75) Inventor: James Pearce, Dublin (IE)

(73) Assignee: Afilias Technologies Limited, Dublin (IE)

( * ) Notice: Subject to any disclaimer, the term of this patent is extended or adjusted under 35 U.S.C. 154(b) by 0 days.

(21) Appl. No.: 12/867,465

(22) PCT Filed: Feb. 12, 2009

(86) PCT No.: PCT/GB2009/000401
§ 371 (c)(1),
(2), (4) Date: Nov. 17, 2010

(87) PCT Pub. No.: WO2009/101414
PCT Pub. Date: Aug. 20, 2009

(65) Prior Publication Data
US 2011/0047249 A1    Feb. 24, 2011

(30) Foreign Application Priority Data
Feb. 12, 2008   (GB) .................................. 0802585.0

(51) Int. Cl.
*G06F 15/16* (2006.01)
*H04L 29/08* (2006.01)
*G06F 17/22* (2006.01)
*G06F 17/30* (2006.01)

(52) U.S. Cl.
CPC .......... *H04L 67/303* (2013.01); *G06F 17/2252* (2013.01); *G06F 17/30625* (2013.01); *G06F 17/30905* (2013.01); *H04L 67/02* (2013.01); *H04L 67/04* (2013.01)

(58) Field of Classification Search
CPC .......... G06F 17/30625; G06F 17/2252; H04L 67/02; H04L 67/303; H04L 67/04; H04L 17/30905
USPC ........................................................ 709/219
See application file for complete search history.

(56) References Cited

U.S. PATENT DOCUMENTS

| 5,884,246 | A  | 3/1999 | Boucher et al. |
| 6,112,192 | A  | 8/2000 | Capek |
| 6,421,733 | B1 | 7/2002 | Tso et al. |

(Continued)

FOREIGN PATENT DOCUMENTS

| AU | 2008203506 | 8/2008 |
| CN | 201181942  | 1/2009 |

(Continued)

OTHER PUBLICATIONS

International Search Report prepared by the European Patent Office issued Mar. 5, 2010, for International Application PCT/GB2009/000401.

(Continued)

*Primary Examiner* — Joseph Greene
(74) *Attorney, Agent, or Firm* — Sheridan Ross P.C.

(57) ABSTRACT

A mobile communication device (1) sends an HTTP request for a Web resource over a mobile network (3) to a Web server (2). The USER AGENT string of the HTTP request is used by the Web server (2) to retrieve properties of the mobile communication device (1) from device properties stored in a device property store (4). The device properties are referenced by nodes of a tree of sample USER AGENT strings for sample mobile communication devices.

29 Claims, 1 Drawing Sheet

(56) References Cited

U.S. PATENT DOCUMENTS

| | | |
|---|---|---|
| 6,546,397 B1 | 4/2003 | Rempell |
| 6,565,609 B1 | 5/2003 | Sorge et al. |
| 6,611,876 B1 | 8/2003 | Barrett et al. |
| 6,613,098 B1 | 9/2003 | Sorge et al. |
| 6,615,212 B1 | 9/2003 | Dutta et al. |
| 6,662,218 B2 | 12/2003 | Mighdoll et al. |
| 6,684,369 B1 | 1/2004 | Bernardo et al. |
| 6,747,365 B2 | 6/2004 | Reinold et al. |
| 6,760,711 B1 | 7/2004 | Gillett et al. |
| 6,888,837 B1 | 5/2005 | Cunningham et al. |
| 6,925,595 B1 | 8/2005 | Whitledge et al. |
| 6,944,665 B2 | 9/2005 | Brown et al. |
| 6,957,394 B1 | 10/2005 | Fernandez et al. |
| 7,178,101 B2 | 2/2007 | Tunning |
| 7,388,844 B1 | 6/2008 | Brown et al. |
| 7,414,743 B2 | 8/2008 | Komaki |
| 7,584,486 B2 | 9/2009 | Yun et al. |
| 7,823,083 B2 | 10/2010 | Rohrabaugh et al. |
| 7,827,312 B2 | 11/2010 | Ramaswamy et al. |
| 7,904,455 B2 | 3/2011 | Chiu et al. |
| 7,962,640 B2 | 6/2011 | Lee |
| 7,970,801 B1 * | 6/2011 | Defrang et al. ............... 707/809 |
| 8,041,346 B2 * | 10/2011 | Tyhurst et al. ................ 709/219 |
| 8,081,956 B2 * | 12/2011 | Aaltonen et al. ........... 455/414.1 |
| 8,291,408 B1 | 10/2012 | Czymontek |
| 2002/0003547 A1 | 1/2002 | Wang et al. |
| 2002/0091582 A1 | 7/2002 | Palmer et al. |
| 2002/0103881 A1 * | 8/2002 | Granade et al. ............... 709/218 |
| 2002/0120684 A1 | 8/2002 | Christfort et al. |
| 2002/0133569 A1 | 9/2002 | Huang et al. |
| 2002/0186248 A1 | 12/2002 | Ramanathan et al. |
| 2002/0190876 A1 | 12/2002 | Lai et al. |
| 2002/0198937 A1 | 12/2002 | Diwan et al. |
| 2003/0004984 A1 | 1/2003 | Chou |
| 2003/0009567 A1 | 1/2003 | Farouk |
| 2003/0023756 A1 | 1/2003 | Awamoto et al. |
| 2003/0061288 A1 | 3/2003 | Brown et al. |
| 2003/0061299 A1 | 3/2003 | Brown et al. |
| 2003/0091166 A1 | 5/2003 | Hershenson |
| 2003/0172186 A1 | 9/2003 | Dunn et al. |
| 2003/0229718 A1 | 12/2003 | Tock et al. |
| 2004/0015567 A1 | 1/2004 | Ziebold et al. |
| 2004/0049574 A1 | 3/2004 | Watson et al. |
| 2004/0064469 A1 | 4/2004 | Takahashi et al. |
| 2004/0117197 A1 | 6/2004 | Dutta et al. |
| 2004/0148571 A1 | 7/2004 | Lue |
| 2004/0205621 A1 | 10/2004 | Johnson et al. |
| 2004/0205650 A1 | 10/2004 | Cheng |
| 2004/0228343 A1 | 11/2004 | Molteni et al. |
| 2004/0229654 A1 | 11/2004 | Farcasiu |
| 2004/0243931 A1 | 12/2004 | Stevens et al. |
| 2004/0255244 A1 | 12/2004 | Filner et al. |
| 2004/0267610 A1 | 12/2004 | Gossett et al. |
| 2005/0015365 A1 | 1/2005 | Kavacheri et al. |
| 2005/0015474 A1 | 1/2005 | Kavacheri et al. |
| 2005/0132286 A1 | 6/2005 | Rohrabaugh et al. |
| 2005/0160065 A1 | 7/2005 | Seeman |
| 2005/0188361 A1 | 8/2005 | Cai et al. |
| 2005/0234864 A1 | 10/2005 | Shapiro |
| 2005/0235256 A1 | 10/2005 | Freydl |
| 2005/0246627 A1 | 11/2005 | Sayed |
| 2006/0015358 A1 | 1/2006 | Chua |
| 2006/0036767 A1 | 2/2006 | Ryan |
| 2006/0230100 A1 | 10/2006 | Shin et al. |
| 2007/0016577 A1 | 1/2007 | Lasa et al. |
| 2007/0027672 A1 | 2/2007 | Decary et al. |
| 2007/0061486 A1 | 3/2007 | Trinh et al. |
| 2007/0083810 A1 * | 4/2007 | Scott et al. .................... 715/525 |
| 2007/0168465 A1 | 7/2007 | Toppenberg et al. |
| 2007/0176796 A1 | 8/2007 | Bliss et al. |
| 2007/0180432 A1 | 8/2007 | Gassner et al. |
| 2007/0220423 A1 | 9/2007 | Charbonneau et al. |
| 2007/0288841 A1 | 12/2007 | Rohrabaugh et al. |
| 2007/0294646 A1 | 12/2007 | Timmons |
| 2008/0022374 A1 | 1/2008 | Brown et al. |
| 2008/0028335 A1 | 1/2008 | Rohrabaugh et al. |
| 2008/0065980 A1 | 3/2008 | Hedbor |
| 2008/0071857 A1 | 3/2008 | Lie |
| 2008/0077855 A1 | 3/2008 | Lev et al. |
| 2008/0176544 A1 | 7/2008 | Holdsworth |
| 2008/0201452 A1 | 8/2008 | Athas et al. |
| 2008/0235566 A1 | 9/2008 | Carlson et al. |
| 2008/0288475 A1 | 11/2008 | Kim et al. |
| 2009/0043798 A1 | 2/2009 | Tan et al. |
| 2009/0077202 A1 * | 3/2009 | Pitts ............................. 709/219 |
| 2009/0089448 A1 | 4/2009 | Sze et al. |
| 2009/0089668 A1 | 4/2009 | Magnani et al. |
| 2009/0094137 A1 | 4/2009 | Toppenberg et al. |
| 2009/0204808 A1 | 8/2009 | Guo et al. |
| 2009/0210514 A1 | 8/2009 | Davis et al. |
| 2009/0300111 A1 | 12/2009 | Rana |
| 2009/0319778 A1 | 12/2009 | Rzepecki et al. |
| 2010/0005310 A1 | 1/2010 | Gentry et al. |
| 2010/0017464 A1 | 1/2010 | Cheng et al. |
| 2010/0017502 A1 | 1/2010 | Cheng et al. |
| 2010/0043017 A1 | 2/2010 | Paul et al. |
| 2010/0095024 A1 | 4/2010 | Wyler et al. |
| 2010/0106565 A1 | 4/2010 | Manesh et al. |
| 2010/0114982 A1 | 5/2010 | Ferrell et al. |
| 2010/0138317 A1 | 6/2010 | Kennedy |
| 2010/0146413 A1 | 6/2010 | Yu |
| 2010/0161394 A1 | 6/2010 | Bell et al. |
| 2010/0174974 A1 | 7/2010 | Brisebois et al. |
| 2010/0199195 A1 | 8/2010 | Carounanidy et al. |
| 2010/0199197 A1 | 8/2010 | Faletski et al. |
| 2010/0274870 A1 | 10/2010 | Cremin et al. |
| 2010/0299395 A1 | 11/2010 | Klassen |
| 2011/0078120 A1 * | 3/2011 | Tyhurst et al. ................ 707/654 |
| 2011/0099467 A1 | 4/2011 | Kapur et al. |
| 2011/0107227 A1 | 5/2011 | Rempell et al. |
| 2011/0231782 A1 | 9/2011 | Rohrabaugh et al. |
| 2011/0258250 A1 | 10/2011 | Cremin |
| 2011/0289316 A1 | 11/2011 | Cremin et al. |
| 2011/0296294 A1 | 12/2011 | Bhadury et al. |
| 2011/0307776 A1 | 12/2011 | Cremin |
| 2012/0011446 A1 | 1/2012 | Harvin et al. |
| 2012/0036494 A1 | 2/2012 | Gurumohan et al. |
| 2012/0060087 A1 | 3/2012 | Jame et al. |
| 2013/0055071 A1 | 2/2013 | Bray |

FOREIGN PATENT DOCUMENTS

| | | |
|---|---|---|
| EP | 0940960 | 9/1999 |
| EP | 1376990 | 1/2004 |
| EP | 1641211 | 3/2006 |
| EP | 1923798 | 5/2008 |
| EP | 2077521 | 7/2009 |
| GB | 2445667 | 7/2008 |
| WO | WO 98/56159 | 12/1998 |
| WO | WO 01/22683 | 3/2001 |
| WO | WO 01/30043 | 4/2001 |
| WO | WO 01/88733 | 11/2001 |
| WO | WO 02/087135 | 10/2002 |
| WO | WO 2004/040481 | 5/2004 |
| WO | WO 2004/088951 | 10/2004 |
| WO | WO 2006/008559 | 1/2006 |
| WO | WO 2007/089320 | 8/2007 |
| WO | WO 2007/137166 | 11/2007 |
| WO | WO 2008/073207 | 6/2008 |
| WO | WO 2009/012461 | 1/2009 |
| WO | WO 2009/036318 | 3/2009 |
| WO | WO 2009/047783 | 4/2009 |
| WO | WO 2009/051471 | 4/2009 |

OTHER PUBLICATIONS

Written Opinion prepared by the European Patent Office issued Mar. 5, 2010, for International Application PCT/GB2009/000401.

International Search Report for International (PCT) Patent Application No. PCT/EP2011/058137, mailed Jul. 18, 2011, 3 pages.

Written Opinion for International (PCT) Patent Application No. PCT/EP2011/058137, mailed Jul, 18, 2011, 5 pages.

(56) References Cited

OTHER PUBLICATIONS

Parziale et al., "TCP/IP Tutorial and Technical Overview (IBM Redbook)," IBM Redbooks, Dec. 2006, at http://www.redbooks.ibm.com/redbooks/pdfs/gg243376.pdf, pp. 426-480.

Trevor et al., "From Desktop to Phonetop: A UI for Web Interaction on Very Small Devices," Proceedings of the 14th Annual ACM Symposium on User Interface Software and Technology, 2001, at http://jonathantrevor.net/trevor/papers/uist2001.pdf, pp. 121-130.

International Search Report for International (PCT) Patent Application No. PCT/GB2009/002420, mailed Mar. 3, 2010, 4 pages.

Written Opinion for International (PCT) Patent Application No. PCT/GB2009/002420, mailed Mar. 3, 2010, 5 pages.

Nelson, "Fast string searching with Suffix Trees," published Aug. 1, 1996, available at http://marknelson.us/1996/08/01/suffix-trees, 11 pages.

European Search Report for European Patent Application No. 082585.0, dated Jun. 20, 2008.

Official Action for U.S. Appl. No. 12/760,205, mailed Feb. 21, 2012 20 pages.

ESPN, Dec. 12, 2007, Internet Archive, http://web.archive.org/web/20071212030046/http://espn.go.com, 3 pages.

Official Action for U.S. Appl. No. 12/760,205, mailed Jul. 17, 2012 17 pages.

Notice of Allowance for U.S. Appl. No. 12/760,205, mailed Nov. 6, 2012, 5 pages.

Notice of Allowance for U.S. Appl. No. 12/760,205, mailed Dec. 19, 2012, 2 pages.

Official Action for U.S. Appl. No. 12/762,521, mailed Jul. 11, 2012 21 pages.

Official Action for U.S. Appl. No. 12/762,521, mailed Jan. 11, 2013, 20 pages.

Official Action for U.S. Appl. No. 12/783,424, mailed Jul. 23, 2012 12 pages.

Official Action for U.S. Appl. No. 13/123,378, mailed Dec. 14, 2012, 17 pages.

Official Action for U.S. Appl. No. 12/762,521, mailed Sep. 5, 2013, 20 pages.

Aho et al., Data Structures and Algorithms, Bell Telephone Laboratories, Inc., 1983, pp. 162-169.

Comer, "Heuristics for Trie Index Minimization," Feb. 1977, 24 pages.

"Wurfl: WAP Universal Resource File," Sourceforge.net, Oct. 21, 2002, [retrieved on Nov. 12, 2012], 31 pages. Retrieved from: http://web.archive.org/web/20021021032915/http://wurfl.sourceforge.net/.

Third Party Observation filed Dec. 17, 2012 for European Patent Application No. EP 20090710546, 8 pages.

Official Action for U.S. Appl. No. 13/123,378, mailed May 10, 2013, 16 pages.

Third Party Observations for European Patent Application No. 09710546.4, dated Feb. 2, 2015, 58 pages.

"Provisioning Sytem for Mobile Communication Devices," IP.com Prior Art Database Technical Disclosure, IP.com No. 000126668, Aug. 10, 2005, 2 pages.

Official Action for U.S. Appl. No. 12/762,521, mailed May 5, 2014, 19 pages.

Notice of Allowance for U.S. Appl. No. 12/762,521, mailed May 15, 2015, 8 pages.

Official Action for U.S. Appl. No. 13/123,378, mailed Aug. 19, 2014, 17 pages.

Official Action for U.S. Appl. No. 13/177,376, mailed Jan. 28, 2014, 19 pages.

Official Action for U.S. Appl. No. 13/177,376, mailed Oct. 6, 2014, 14 pages.

\* cited by examiner

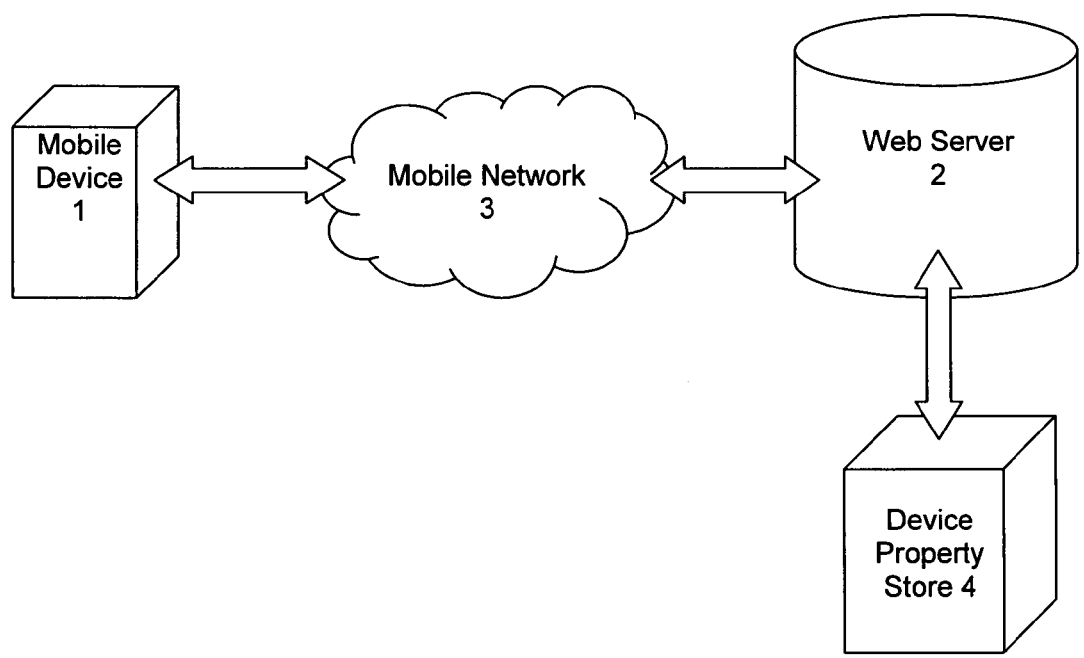

# DETERMINING A PROPERTY OF A COMMUNICATION DEVICE

CROSS REFERENCE TO RELATED APPLICATIONS

This application is a national stage application under 35 U.S.C. 371 of PCT Application No. PCT/GB2009/000401 having an international filing date of 12 Feb. 2009, which designated the United States, which PCT application claimed the benefit of Great Britain 0802585.0 filed 12 Feb. 2008, the entire disclosure of each of which are hereby incorporated herein by reference.

FIELD OF THE INVENTION

The present invention relates to a method and apparatus for determining a property of a communication device. The invention is particularly, but not exclusively, applicable to optimising content for providing to a communication device based on a determined property of the device, such as altering a Web resource for delivery to a mobile telephone depending on its screen size.

BACKGROUND TO THE INVENTION

Many communication devices are capable of using a variety of content obtainable over communication networks. In particular, mobile devices such as mobile telephones, Personal Digital Assistants (PDAs), Smartphones and such like are now generally capable of using Web resources, such as Web pages. These Web resources may be specifically intended for mobile devices, such as content coded using Wireless Markup Language (WML) and obtainable using Wireless Application Protocol (WAP). With the advent of faster mobile communication networks, mobile devices are now also increasingly capable of using Web resources intended for wider use, e.g. by Personal Computers, such as content coded using HyperText Markup Language (HTML) and Extensible Markup Language (XML), in particular Extensible HyperText Markup Language (XHTML).

Due to the very different capabilities of different mobile devices, the various types of Web resources that are available may or may not be useable by a particular mobile device or might be used with different degrees of success by different mobile devices. This significantly detracts from users' experiences of accessing Web resources with their mobile devices. Whilst improved handling of Web resources can be attained to a large extent by browser functionality at the mobile device, it has also been suggested to adapt Web resources to suit the capabilities of a mobile device requesting the resource. So, rather than providing a Web resource in exactly the same way to every mobile device that requests it, Web servers increasingly adapt Web resources according to the capabilities of the mobile device requesting the resource. For example, a picture may be provided to a mobile device in an original size only if the screen of the mobile device is big enough to display it. If the mobile device does not have a big enough screen, the picture may be reduced to a suitable size before it is provided to the mobile device.

Much time and effort has been invested in collecting information about the capabilities of different mobile devices. These capabilities are usually defined in terms of device properties. One device property may be screen width. Another might be screen height. These device properties are made available for the use of Web developers in the form of databases of device properties for different mobile devices. Web resources can accordingly be designed according to the capabilities of particular mobile devices, as defined in the databases of device properties. Provided the type of mobile device requesting the Web resource is known, an appropriately designed Web resource can be provided to the mobile device and successfully used by the device.

It has been suggested to identify the type of mobile device requesting a Web resource from the request sent by the device for the Web resource to be provided to it. In particular, HTTP requests include a user agent string in a header. A user agent string is a string of characters usually containing the manufacturer, model and version number of the mobile device, the operating system it is using and so on. EP 1641211 suggests storing known user agent strings in a first look up table. The user agent string in an HTTP request is then compared to the look up table of known user agent strings to identify the mobile device that sent the HTTP request. A second look up table of policies governing code generation for Web resources to be provided to the identified device is then accessed and the Web resource is coded for provision to the mobile device based on the policies in the further look up table.

A problem with this approach is that there is a very large number of user agent strings in use. One type of mobile device may use numerous different user agent strings depending on the version of the mobile device or the versions of software the device is running. Furthermore, user agent strings may be altered as they travel through the communication network by the network itself. This means that a look up table of known user agent strings is likely to be large. There is also a strong likelihood of an exact match for the user agent string in the HTTP request not being present in the look up table. This can result in the device not being identified and it hence being impossible to implement any policies for generation of the Web resource.

Another problem is that the use of the two look up tables is slow. The whole of the user agent string in the HTTP request is first compared to known user agent strings in the first look up table to try to find a match. In the event that the match is found, the second look up table is located and appropriate policies extracted from that table. As the first look up table is large, it will be slow to search. The comparison and extraction processes also require significant processing time. So, there can be a noticeable extension to the time it takes to respond to the HTTP request using this method.

The present invention seeks to overcome these problems.

SUMMARY OF THE INVENTION

According to a first aspect of the present invention, there is provided a method of determining a property for a subject communication device, which subject communication device has a string of characters associated with it, the method comprising:

receiving the string of characters associated with the subject communication device; and using the received string of characters to retrieve a property from a store of previously identified properties of sample communication devices, wherein the previously identified properties in the store are referenced by nodes of a tree of sample strings of characters similarly associated with the sample communication devices.

The received string of characters is usually included in a request sent by the subject communication device for content to be provided to it. Indeed, according to a second aspect of the present invention, there is provided a method of providing content to, a subject communication device over a communications system, which subject communication device has a string of characters associated with it, the method comprising:

receiving a request from the subject communication device for content to be provided to it, the request including the string of characters associated with the communication device;

determining a property for the subject communication device by using the received string of characters to retrieve a property from a store of previously identified properties of sample mobile devices; and optimising the content based on the retrieved property, wherein the previously identified properties in the store are referenced by nodes of a tree of sample strings of characters similarly associated with the sample communication devices.

So, a property of a device may be determined from properties referenced by nodes of a tree. The tree can be searched much more quickly than a look up table. In particular, it is possible to determine a property without using the whole of a string of characters. The string only needs to be used to the extent required to locate the node of the tree by which a property is referenced. This allows quicker determination of a property of a device than in the prior art.

Both the received string of characters and the sample strings of characters are usually user agent strings. However, different strings of characters associated with the communication devices may be used. For example, the received string of characters may be a field of the request indicating the type of content preferred by the communication device. The string of characters may be part of the header of an HTTP request, e.g. the contents of the USER-AGENT field or one of the ACCEPT fields.

In some cases, it may be useful for different types of strings of characters to be used in relation to determining different types of properties of the subject device. For example, a user agent string may be used in relation to determining some properties and a field of the request indicating the type of content preferred by the communication device may be used in relation to determining other properties. It can therefore be useful for the previously identified properties in the store to be referenced by nodes of more than one tree of sample strings of characters, the type of sample strings of characters being different for different trees.

Optimal organisation of the tree can maximise the speed with which a property can be determined. For example, each previously identified property may be referenced by the first node along the tree common to the sample communication devices having that previously identified property.

The nodes typically comprise substrings of the strings of characters. These substrings may be individual characters of the strings of characters. However, at least some of the substrings are usually more than one character long. This makes the tree more compact.

The strings of characters tend to be read on a character by character basis, e.g. in sequence. Typically, this is from left to right in a conventional manner. Usually, it is therefore convenient for the substrings to comprise serial parts of the sample strings of characters. Indeed, the substrings usually comprise consecutive parts of the sample strings of characters.

In order to make the tree as compact as possible, it is useful to eliminate unnecessary nodes. So the tree may be arranged such that no node of the tree has only one child node unless that child node references a property. Furthermore, the tree may be arranged such that no node of the tree both has no children and does not reference a property.

The properties tend to comprise attributes that have values. These values may be at least numbers, characters or Boolean values.

A node may be flagged when it references a property comprising an attribute with a value and there is a later node along the tree that references a property comprising the same attribute with a different value. This can help to allow efficient organisation of the tree, for example for properties of devices associated with strings of characters that are only distinguished from one another by a suffix of one string absent from another string.

The properties may simply be provided in the tree at the nodes. Alternatively, the properties may be provided in a look up table referenced by nodes of the tree. This can allow the tree to be coded more efficiently. Indeed, the tree may be coded in a serial format, such as JavaScript Object Notation.

Retrieving a property from the store may comprise querying the tree with a function including the received string of characters. The function may request a single property or multiple properties. So, there is provided a method of determining multiple properties for the subject communication device using the method above to retrieve multiple previously identified properties from the store. Likewise, the method of providing content to the subject communication device may comprise determining multiple properties for the subject communication device by using the received string of characters to retrieve multiple previously identified properties from the store. The subject communication device is usually wireless. The content is usually a Web resource. The invention extends to apparatus for determining a property of a subject communication device, the apparatus comprising a processor for carrying out the method above. It also extends to apparatus for providing content to a user over a communications system, the apparatus comprising a processor for carrying out the method above. The apparatus may comprise a Web server.

Use of the term "processor" above is intended to be general rather than specific. The invention may be implemented using an individual processor, such as a digital signal processor (DSP) or central processing unit (CPU). However, the invention could equally be implemented using a hard-wired circuit or circuits, such as an application-specific integrated circuit (ASIC), or by embedded software, and it is intended that the term "processor" includes these options.

It can also be appreciated that the invention can be implemented using computer program code. Indeed, according to a further aspect of the present invention, there is therefore provided computer software or computer program code adapted to carry out the method described above when processed by a processing means. The computer software or computer program code can be carried by a computer readable medium. The medium may be a physical storage medium such as a Read Only Memory (ROM) chip. Alternatively, it may be a disk such as a Digital Versatile Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer configured to carry out the method described above.

BRIEF DESCRIPTION OF THE DRAWINGS

Preferred embodiments of the invention are now described, by way of example only, with reference to the accompanying drawings, in which:

FIG. 1 shows a schematic illustration of apparatus for carrying out the present invention.

DETAILED DESCRIPTION OF THE PREFERRED EMBODIMENTS

Referring to FIG. 1, in a preferred embodiment of the invention, a mobile device 1 communicates with a Web server 2 over a mobile network 3. The mobile device 1 is a mobile telephone, Personal Digital Assistant (PDA), Smartphone or such like. In other embodiments, the mobile device 1 is a satellite telephone, personal computer or such like. The mobile network 3 is a terrestrial wireless communication network, such as a Global System for Mobile Communications (GSM) network, Code Division Multiple Access (CDMA) network, Universal Mobile Telecommunications System (UMTS) or Third Generation Wireless Format (3G) network. In other embodiments, the mobile network 3 is a satellite telecommunications network, the internet, a wired telecommunications network or such like.

The Web server 2 hosts at least one Web resource. Typically, the Web resource comprises a Web page coded in Extensible HyperText Markup Language (XHTML) according to the World Wide Web Consortium (W3C) Recommendation. Alternatively, the Web resource may comprise a picture, sound or audiovisual file. The Web server 2 is connected to a device property store 4. In this embodiment, the device property store 4 is implemented as an Application Programming Interface (API) running on the same computer system as the Web server 2. However, in other embodiments, the device property store 4 is implemented on a separate computer system and the Web server 2 communicates with the device property store 4 over a network.

The mobile device 1 is one of many different types generally available. Different types of mobile device 1 have different device properties, which can each be defined by an attribute and a value. Terminology can vary in this regard, with device properties regularly themselves being referred to as attributes, characteristics, capabilities, functions or such like. The terminology used in this document is used for clarity and is not intended to be limiting. It should also be understood that a value is not limited to being a number, but can be a character or Boolean value for example. The device property store 4 contains device properties for known types of mobile device 1, in other words sample mobile devices. Examples of the device properties of a sample mobile device comprising a Nokia® 6680 mobile telephone are shown in Table I below.

TABLE I

| DEVICE PROPERTY | |
|---|---|
| ATTRIBUTE | VALUE |
| Id: | 203901 |
| deviceModel: | 6680 |
| deviceVendor: | Nokia |
| mpeg4: | True |
| drmOmaForwardLock: | True |
| markup.xhtmlBasic10: | True |
| midiMonophonic: | True |
| image.Gif89a: | False |
| uriSchemeTel: | False |
| memoryLimitMarkup: | 4194304 |
| hsdpa: | False |
| memoryLimitDownload: | 61440 |
| markup.xhtmlMp11: | False |
| edge: | True |
| drmOmaSeparateDelivery: | True |
| qcelp: | False |

TABLE I-continued

| DEVICE PROPERTY | |
|---|---|
| ATTRIBUTE | VALUE |
| image.Gif87: | True |
| hscsd: | False |
| screenHeight: | 208 |
| 3gpp2: | False |
| image.Jpg: | True |
| drmOmaCombinedDelivery: | True |
| image.Png: | True |
| midiPolyphonic: | True |
| markup.xhtmlMp12: | False |
| gprs: | True |
| 3gpp: | True |
| umts: | False |
| amr: | True |
| wmv: | False |
| https: | True |
| aac: | True |
| screenColorDepth: | 18 |
| markup.xhtmlMp10: | True |
| screenWidth: | 176 |
| csd: | False |
| mobileDevice: | True |
| mp3: | True |

In order to access the Web resource, the mobile device 1 sends a request over the mobile network 3 to the Web server 2. The request is sent using Hypertext Transfer Protocol (HTTP) and includes a header. The header includes a number of fields that are populated by the mobile device 1 before the request is sent. In particular, a user agent field includes a user agent string referred to as simply a USER AGENT, identifying the mobile device 1 and the software it is using. Various USER-AGENTs are known to exist for the Nokia® 6680 mobile telephone, as shown in Table II below.

TABLE II

| USER-AGENT |
|---|
| Nokia6680/1.0 (1.50.1) Series60/2.6 Profile/MIDP-2.0 Configuration/CLDC-1.1 |
| Nokia6680/1.0 (2.04.021) SymbianOS/8.0 Series60/2.6 Profile/MIDP-2.0 Configuration/CLDC-1.1 |
| Nokia6680/1.0 (2.04.14) SymbianOS/8.0 Series60/2.6 Profile/MIDP-2.0 Configuration/CLDC-1.1 |
| Nokia6680/1.0 (4.04.07) SymbianOS/8.0 Series60/2.6 Profile/MIDP-2.0 Configuration/CLDC-1.1 |
| Nokia6680/1.0 (4.04.07) SymbianOS/8.0 Series60/2.6 Profile/MIDP-2.0 Configuration/CLDC-1.1 UP.Link/6.3.1.13.0 |
| Nokia6680/1.0 (4.04.07) SymbianOS/8.0 Series60/2.6 Profile/MIDP-2.0 Configuration/CLDC-1.1 Java/1.5.0_08 |
| Nokia6680/1.0 (4.04.07) SymbianOS/8.0 Series60/2.6 Profile/MIDP-2.0 Configuration/CLDC-1.1 Java/1.5.0_11 |
| Nokia6680/1.0 (4.04.07) SymbianOS/8.0 Series60/2.6 Profile/MIDP-2.0 Configuration/CLDC-1.1 UP.Link/6.3.0.0.0 |
| Nokia6680/1.0 (5.04.07) SymbianOS/8.0 Series60/2.6 Profile/MIDP-2.0 Configuration/CLDC-1.1 |

As can be seen, the USER-AGENT starts with text identifying the name of the mobile device 1. This is followed by version numbers of the mobile device 1, the operating system it is running and the version of that operating system. The last part of the USER-AGENT is usually added by the mobile network 3, e.g. at a WAP gateway or such like. The USER-AGENT actually sent by the mobile device 1 in a request for a Web resource over the mobile network 3 may be similar to, but not necessarily exactly the same as, those in Table II. This means that it is possible to reference the properties in the store 4 using the USER-AGENTs expected to be sent by the sample mobile devices, e.g. sample USER-AGENTs. The referencing uses a tree.

Generating the Tree

By way of example, the USER-AGENTs shown in Table II are simplified and some fictional properties of sample mobile devices, similar to some of the properties shown in Table I, are associated with them in Table III below.

TABLE III

| SIMPLIFIED USER-AGENT | DEVICE PROPERTY | |
|---|---|---|
| | ATTRIBUTE | VALUE |
| Nokia6680/1.0 (1.50.1) | deviceVendor | Nokia |
| | screenWidth | 176 |
| | screenHeight | 208 |
| Nokia6680/1.0 (2.04.021) | deviceVendor | Nokia |
| | screenWidth | 176 |
| | screenHeight | 210 |
| Nokia6680/1.0 (2.04.14) | deviceVendor | Nokia |
| | screenWidth | 176 |
| | screenHeight | 210 |
| Nokia6680/1.0 (4.04.07) | deviceVendor | Nokia |
| | screenWidth | 178 |
| | screenHeight | 210 |

In order to generate the tree, in a first step, a character-by-character tree is created from the sample USER-AGENTs, where each node represents a character of a sample USER-AGENT, starting from the left. So, using the example shown in Table III, the character-by-character tree can be illustrated as shown in Table IV.

TABLE IV

CHARACTER-BY-CHARACTER TREE

```
N
-o
 -k
  -i
   -a
    -6
     -6
      -8
       -0
        -/
         -1
          -.
           -0
            -[space]
             -(
              -1
               -.
                -5
                 -0
                  -.
                   -1
                    -)
                     -2
                      -.
                       -0
                        -4
                         -.
                          -0
                           -2
                            -1
                             -)
                              -1
                               -4
                                -)
                         -4
                          -.
                           -0
                            -4
                             -.
                              -0
                               -7
                                -)
```

In a second step, the properties of the sample mobile devices with which each of the sample USER-AGENTs is associated are inserted in the character-by-character tree at the end of the respective sample USER-AGENT. Again, using the example shown in Table III, the character-by-character tree with properties inserted can be illustrated as shown in Table V.

TABLE V

TREE WITH PROPERTIES INSERTED

```
N
-o
 -k
  -i
   -a
    -6
     -6
      -8
       -0
        -/
         -1
          -.
           -0
            -[space]
             -(
              -1
               -.
                -5
                 -0
                  -.
                   -1
                    -)
>deviceVendor=Nokia
>screenWidth=176
>screenHeight=208
                     -2
                      -.
                       -0
                        -4
                         -.
                          -0
                           -2
                            -1
                             -)
>deviceVendor=Nokia
>screenWidth=176
>screenHeight=210
                              -1
                               -4
                                -)
>deviceVendor=Nokia
>screenWidth=176
>screenHeight=210
                         -4
                          -.
                           -0
                            -4
                             -.
                              -0
                               -7
                                -)
>deviceVendor=Nokia
>screenWidth=178
>screenHeight=210
```

Next, the tree is condensed. Firstly, a method called convection is used. This involves moving the properties back along the tree wherever possible. Starting at the ends of the tree at which the youngest child nodes are located, each property is considered for convection to a parent node. Any properties having the same attribute and value that are located at nodes having a common parent node are moved to that common parent node, assuming that there is not already a property with that attribute and a different value located at the parent node. Also, properties located at nodes that are single child nodes are moved to the oldest parent node that does not itself have, or have any child node that has, a property comprising the same attribute with a different value. These convention rules are summarised in Table VI below.

TABLE VI

CONVECTION RULES

|  |  | NO CONVECTION | | |
|---|---|---|---|---|
| CONVECTION | | DUE TO VALUES BEING DIFFERENT | DUE TO ONLY ONE CHILD HAVING VALUE SPECIFIED | DUE TO PARENT HAVING DIFFERENT VALUE SPECIFIED |
| ORIGINAL TREE | CONVECTED TREE | | | |
| A -B >colour=red -C >colour=red | A >colour=red -B -C | A -B >colour=red -C >colour=blue | A -B >colour=red -C | A >colour=blue -B >colour=red -C >colour=red |

This process goes recursively back along the tree and for each property. So the tree shown in Table V is condensed to the tree shown in Table VII below.

TABLE VII

CONVECTED TREE

```
N
>deviceVendor=Nokia
-o
 -k
  -i
   -a
    -6
     -6
      -8
       -0
        -/
         -1
          -.
           -0
            -[space]
             -(
              -1
               >screenWidth=176
               >screenHeight=208
              -.
               -5
                -0
                 -.
                  -1
                   -)
              -2
               >screenWidth=176
               >screenHeight=210
              -.
               -0
                -4
                 -.
                  -0
                   -2
                    -1
                     -)
                  -1
                   -4
                    -)
              -4
               >screenWidth=178
               >screenHeight=210
              -.
               -0
                -4
```

TABLE VII-continued

CONVECTED TREE

```
                 -.
                  -0
                   -7
                    -)
```

Next, any nodes that have no child nodes or properties are removed from the tree. So, the tree shown in table VII becomes the tree shown in Table VIII below.

TABLE VIII

TREE WITH NODES HAVING NO CHILD NODES OR PROPERTIES REMOVED

```
N
>deviceVendor=Nokia
-o
 -k
  -i
   -a
    -6
     -6
      -8
       -0
        -/
         -1
          -.
           -0
            -[space]
             -(
              -1
               >screenWidth=176
               >screenHeight=208
              -2
               >screenWidth=176
               >screenHeight=210
              -4
               >screenWidth=178
               >screenHeight=210
```

Finally, any nodes that have only single child nodes and no properties are collapsed. In other words, single child nodes at which no property is located are combined with their parent. So, the tree shown in table VIII becomes the tree shown in Table IX below.

TABLE IX

TREE WITH NODES HAVING SINGLE CHILDREN AND NO PROPERTIES REMOVED

```
N
>deviceVendor=Nokia
-okia6680/1.0 (
 -1
  >screenWidth=176
  >screenHeight=208
 -2
  >screenWidth=176
  >screenHeight=210
 -4
  >screenWidth=178
  >screenHeight=210
```

This essentially forms the tree. However, it will be appreciated that, in the example tree used, all the properties were initially located at the youngest child nodes of the tree, so there was never the issue of a property located at a child node contradicting a property located at a parent node. As some USER-AGENTs are exactly substrings of others, this may not always be the case. Rather, it is possible that properties may be located such that conflicts can arise. For example, if there is an additional sample USER-AGENT "Nokia6680/1.0 (" and the sample device having this sample USER-AGENT has the property screen Width=170, this should also exist in the example tree at a parent of the nodes having properties with the same attribute but different values. In order to handle this difficulty, the value at the parent node is flagged as being a "masker". In other words, any algorithm searching through the tree is alerted to the fact that there may be a more refined value further along the tree and that it should continue to search along the tree if possible. So, the example tree shown in Table IX becomes the tree shown in Table X below.

TABLE X

TREE WITH MASKING FLAG ADDED

N
>deviceVendor=Nokia
-okia6680/1.0 (
  >screenWidth=170*
  -1
  >screenWidth=176
  >screenHeight=208
  -2
  >screenWidth=176
  >screenHeight=210
  -4
  >screenWidth=178
  >screenHeight=210 where * indicates a masking flag.

Encoding the Tree

So far the content and structure of the tree has been illustrated. However, in order for the tree to be stored in the device property store 4 in a useable format, it is encoded. Typically, the tree formation and encoding is carried out centrally, e.g. at a central server. The encoded tree is then downloaded to the device property store 4. This can allow many Web servers 2 to have local device property stores 4 associated with them, which stores 4 can be updated regularly from the central server.

In order to encode the tree, the properties are first mapped to a look up table positioned before the tree. This reduces the size still further and hence improves the speed with which the tree can be searched. In more detail, the attributes of all the properties in the tree are mapped to attribute IDs and a look up table of attribute to attribute ID is placed at the beginning of the tree. There is also a single character prefixed to the attribute to indicate the data type (s for string, i for integer, b for Boolean etc). The values of all the properties are also mapped to value IDs and a look up table of value to value ID is placed at the beginning of the tree. The look up table of value to value ID precedes the look up table of attribute from attribute ID. So, the example tree shown in Table X becomes the re-ordered tree shown in Table XI below.

TABLE XI

TREE WITH PROPERTIES MOVED TO LIST AT TOP

[values]
Nokia
170
176
208
210
178

TABLE XI-continued

TREE WITH PROPERTIES MOVED TO LIST AT TOP

[attributes]
sdeviceVendor
iscreenWidth
iscreenHeight
[tree]
N
>0=0
-okia6680/1.0 (
  >1=1*
  -1
  >1=2
  >2=3
  -2
  >1=2
  >2=4
  -4
  >1=5
  >2=4

The tree then has some metadata placed at the top, such as date of generation and version of the scheme. It is then encoded in this example using JavaScript Object Notation (JSON), as described at http://json.org. The encoding can be referred to as serialisation, as it replaces the tree structure with parentheses or such like. In Table XII below showing an encoded version of the example tree shown in Table XI, indentation and line breaks representing the nodes are retained for clarity, but are not present in reality. Each node has a "c" array for children, and a "d" array for data. The "m" array is used to list masked properties. The key of the array is the property and the value is always 1. The tree has peer arrays "v" for value lookup, "p" for property lookup, and "$" for metadata.

TABLE XII

SERIALISED TREE

```
{
  "$":{"Ver":"0.7","Rev":"$Rev: 1862 $","Gen":"06 Feb 2008","Utc":1202318808},
  "v":["Nokia",170,176,208,210,178],
  "p":["sdeviceVendor","iscreenWidth","iscreenHeight"],
  "t":{
    "c":{
      "N":{
        "d":{"0":0},
        "c":{
          "okia6680/1.0 (":{
            "d":{"1":1},
            "m":{"1":1},
            "c":{
              "1":{
                "d":{"1"=2,"2":3}
              }
              "2":{
                "d":{"1"=2,"2":4}
              }
              "4":{
                "d":{"1"=5,"2":4}
              }
            }
          }
        }
      }
    }
  }
}
```

Retrieving Properties Using the Tree

In this embodiment, when it is desired to retrieve properties from the device property store 4, the tree is decoded for use.

For example, on starting the API, the tree is deserialised from its JSON encoding. Then, when a USER-AGENT is received from the mobile device 1, the web server 2 uses an algorithm to retrieve one or more properties. In this embodiment, either a single property or all properties for the received USER-AGENT can be retrieved.

Retrieving a Single Property

In the case of retrieving a single property for a received USER-AGENT, the Web server 2 uses a function having the form getProperty(tree, ua, propertyName)

where "tree" is a reference to the tree in the store 4 (deserialised from the JSON at start-up of the API), "ua" is the received USER-AGENT, e.g. "Nokia6680/1.0 (2.04.021) SymbianOS/8.0 Series60/2.6 Profile/MIDP-2.0 Configuration/CLDC-1.1" and "propertyName" is the attribute e.g. "screenWidth" of the required property.

This function causes an algorithm to look up the attribute ID for the attribute "screenWidth" in the attribute to attribute ID lookup table in the tree. In this example, the desired attribute ID is "1" and the algorithm also establishes from the tree that the attribute has datatype "i" (an integer). The algorithm then starts to search the tree of sample USER-AGENTs by comparing the received USER-AGENT to the nodes of the tree. The first node can technically contain properties, for example if there is a property that has the same value for every mobile device in the tree. So, the algorithm checks whether or not the first node has an attribute ID that matches the desired attribute ID. If a matching attribute ID is found, then the value ID is read and the value corresponding to that value ID is retrieved from the value to value ID look up table. If there is no matching attribute ID at the first node, the algorithm continues to search along the tree. This is done by the algorithm comparing the next character of the received USER-AGENT to the child nodes of the first node and selecting whichever child matches, if any. If a child exists that has that single character, the algorithm selects that node. If a child node having that single character does not exist, the algorithm appends the next character of the received USER-AGENT and tries again and so on. Each time a node is selected, the algorithm checks whether or not the selected node has a matching attribute ID. If the attribute ID is found, then the value ID is read and the value corresponding to that value ID is retrieved. If there is no matching attribute ID, the algorithm continues to search along the tree, remembering how far along the USER AGENT it is.

So, in the example, the algorithm looks to see if the attribute ID "1" is in the data array "d" for the first node. There is no property located at the first node of the example, so the algorithm continues to search along the tree. This is done by the algorithm comparing single character "N" to the child nodes of the first node. There is a child node N, so this node is selected. There is a property at this node, "d":{"0":0}, but this is not the one being sought, as its attribute ID is not "1". So, the algorithm again continues to search along the tree. This is done by the algorithm comparing single character "o" to the child nodes of the presently selected node. No such child node exists, so the algorithm appends the next character of the USER-AGENT and tries again, e.g. with "ok"), and so on (e.g. with "oki", "okia", etc). A match is in fact only found once the algorithm uses the string "okia6680/1.0 (". At this node the algorithm also finds attribute ID "1" and can retrieve value ID 1, which yields value 170. Normally, this would cease the recursion and the algorithm would return the value 170. However, that would be incorrect, since there is more of the USER-AGENT to be recognised and some of the younger nodes have more refined values. This is where the "masker" list comes in. The algorithm sees that attribute ID "1" is in the marker list and realises that it needs to continue. So, the algorithm continues to search for child nodes using the next characters of the received USER-AGENT, e.g. "2". There is such a node, and it again has the attribute ID "1", with value ID "2". Since there is no indication that this is masking any deeper values (in fact this node does not have a masking list), the search can cease, and the function returns value 176 (which is the value of value ID "2").

If there is no value in the tree for the property included in the function, the attribute ID is not found at the nodes visited. In other words, the recursion reaches the bottom of the tree without having found the attribute ID. In this event, the function returns a null value. However, if the function includes a property that does not exist, this can be detected earlier, since the algorithm will notice that the attribute to attribute ID look up table at the top of the tree does not include an attribute for that property and it is unable to retrieve the attribute ID to search tree with. Again, this event, the function returns a null value (more quickly)

Retrieving All Properties

In the case of retrieving all properties for a received USER-AGENT, the Web server 2 uses a function having the form getProperties(tree, ua)

where "tree" is a reference to the tree in the store (deserialised from the JSON at start-up of the API) and "ua" is the received USER-AGENT, e.g. "Nokia6680/1.0 (2.04.021) SymbianOS/8.0 Series60/2.6 Profile/MIDP-2.0 Configuration/CLDC-1.1".

This function causes an algorithm to return a list of all the properties for the received USER-AGENT. There is a difference between this algorithm's searching technique and the one described above for single properties. This algorithm needs to find as many properties as possible, so it does not try to stop early simply because a property has been found. In fact, this algorithm does not consider the properties that might be found, it simply searches to the very bottom of the tree or as far as it can go, returning all properties it comes across. In more detail, the algorithm starts. It starts at the first node. If a property is found, it looks up the attribute ID and value ID for the property and puts them at the top of a list. It then compares the next character of the received USER-AGENT to the child nodes of the first node and selects whichever child matches, if any. If a child exists that has that single character, the algorithm selects that node. If a child node having that single character does not exist, the algorithm appends the next character of the received USER-AGENT and tries again and so on. Each time a node is selected, the algorithm looks up the attribute ID and value ID for the property and adds them to the list. When there are no more child nodes, the algorithm finishes and returns the list.

In the example, the first property discovered is at the "N" node: "d":{"0":0}. So the algorithm records that attribute and value for that attribute ID and value ID and continues as above, reaching the "okia6680/1.0 (" node. The algorithm does not consider the masking array. Instead, new values that are found are used to overwrite values that are already in the list. For example, attribute ID "1"=value ID "2" will simply overwrite attribute ID "1"=value ID "1". The recursion continues to the "2" node as before, and there it picks up two more properties. "d":{"1"=2,"2":4}. Attribute ID "1"=value ID "2" overrides the current gathered property and attribute ID "2"(=value ID "4") is new. From this node, there is nowhere further to go. There is more of the USER-AGENT to be considered, but no further child nodes. This may seem strange since we did originally use a sample USER-AGENT of this full length. However the tree generation took account of the fact that progressing further along the string would have added no further information.

Therefore, the algorithm ceases at this point, returning attribute ID "0"=value ID "0", attribute ID "1"=value ID "2" and attribute ID "2"=value ID "4 which gets mapped back, at the last minute to deviceVendor=Nokia
   screenWidth=176
   screenHeight=210
   which is what we knew all along.

Unknown USER-AGENTs

It is possible that the received USER-AGENT does not match exactly any of the sample USER-AGENTs used to build the tree. In this case, the algorithm already described naturally performs a "best match". For example, simplified received USER-AGENT "Nokia6680/1.0 (2.05.017)" appears to relate to a later revision of the sample mobile devices with simplified sample USER-AGENTs "Nokia6680/1.0 (2.04.021)" and "Nokia6680/1.0 (2.04.14)" that were used to build the tree. The tree was built on the basis that both the sample devices have a screen height of 210. So, a function based on the new received USER-AGENT looking for screen height would return this value.

If in the future, the device from which the new received USER-AGENT originates is included as a sample device, this might be refined. For example, say we learn that this device has a screen height of 212. The tree shown in Table X above would then be revised to look like Table XIII below.

TABLE XIII

REVISED TREE

N
  >deviceVendor=Nokia
  -okia6680/1.0 (
    >screenWidth=170*
    -1
     >screenWidth=176
     >screenHeight=208
    -2.0
     >screenWidth=176
     -4
      >screenHeight=210
     -5
      >screenHeight=212
    -4
     >screenWidth=178
     >screenHeight=210

It should be noted that the screen width has not changed, so stays at the parent node, but the height is now specified in two peer child nodes. This is equivalent to saying "we can't generalise about 2.0 screen height any more", and means that we return different values for the different USER-AGENTs. However, we can generalise about screen width, so that stays above.

Consider now a further simplified received USER-AGENT "Nokia6680/1.0 (2.06.009)" that does not match exactly any of the sample USER-AGENTs used to build the revised tree. If we ask for screen width, the recursion stops at the "2.0" node again. This node has property "screen Width=176" that will be returned by the algorithm. Given that the simplified sample USER-AGENTs used to build the tree are the same as the further simplified received USER-AGENT up to the character in this node, it is fair to assume that the corresponding sample mobile devices and the mobile device 1 that sent the request are in the same family. As the two known members of the family had a screen width of 176, so it is fair to return that this new one does too.

Weighted Assessments of for Unknown USER-AGENTs

Taking the last example given above, but using a function asking for screen height instead of screen width, when the algorithm reaches the node "2.0", it has no further to progress down the tree. The next character of the USER-AGENT is "6" and there are only child nodes for "4" and "5". So the search ceases at this point. The algorithm does not reach an explicit value for screen height. So, the algorithm described so far returns null. This is fair as the two sample devices having the closest sample USER-AGENTs have differing values for screen height and it may not be reasonable to make an assumption about what the third would be. However, with a little more information, an assumption may be made. Consider a further modified version of the tree shown in Table XIII above, as shown in Table XIV below.

TABLE XIV

FURTHER REVISED TREE

N
  >deviceVendor=Nokia
  -okia6680/1.0 (
    >screenWidth=170*
    -1
     >screenWidth=176
     >screenHeight=208
    -2.0
     >screenWidth=176
     -4
      >screenHeight=210
     -5
      >screenHeight=212
     -6
      >screenHeight=212
     -7

If a simplified received USER-AGENT "Nokia6680/1.0 (2.09.009)" is used to search this tree for screen height, the algorithm again ceases at the "2.0" node because a child node of "9" does not exist and no explicit screen height property is found. However, as this further modified tree contains information about another device, an assumption about screen height can be made. In this example, 80% of the child nodes have the same value for screen height of 212. Of course, if all had had the same value, the value would have risen to the parent node. However, this is not quite the case here. Rather, the algorithm determines that that is a significant enough probability to return 212 as an extrapolated value. Typically, a threshold of say between 50% and 70% of child nodes having a given value is appropriate to assume that value for non-matching USER-AGENTs. This may be further weighted by assuming that increasing version numbers mean increasing capability. When a value is assumed, a reduced "confidence" level is generally associated with it and flagged when the value is returned.

Returning Analytics about Unmatched USER-AGENTs

When the Web server 2 queries the device property store 4 with a received USER-AGENT that does not match any of the sample USER-AGENTs in the store 4, the store 4 passes information about the unmatched USER-AGENT to the central server that generates the tree. Knowledge about the unmatched USER-AGENTs can then be used to identify what unrecognised devices that may be in use. This can improve the reliability with which the tree is updated by the central server.

Multiple Trees

Fields other than the user agent field are present in the header of the HTTP request that the mobile device 1 sends to the Web server 2. In particular, an accept field can be used to list the sort of pages and content types that the mobile device 1 prefers to receive. Examples of some accept strings, referred to simply, as ACCEPTs, included in the accept field are given in the Table XV below.

TABLE XV

ACCEPT

Accept: application/xhtml+xml, text/css, image/jpeg, image/gif
Accept: text/html, image/gif, image/jpeg, *; q=.2, */*; q=.2
Accept: text/html, application/vnd.wap.xhtml+xml, application/xhtml+xml, text/css, multipart/mixed Using an ACCEPT instead of a USER-AGENT to build a tree can provide quicker ways of reaching certain properties. It is unlikely that a tree constructed from ACCEPTs would helpfully reference screen sizes, for example. However, certain properties may be highly relevant. "supportsHTML", for example, would be an attribute that might easily fit into such a tree, and rise up to a node containing "text/html". In this case, the algorithm determines which tree (USER AGENT or ACCEPT) is best to find the property requested by the function. The algorithm is also adapted for using an ACCEPT tree, e.g. to deal with the comma-delimited lists of an ACCEPT, where the order of the characters in the whole string is not as significant as in a USER-AGENT. For example, the string "text/html" might appear at the very end of one ACCEPT, but at the start of another and treated as a root node. It might also be that the algorithm can be adapted to learn from its experience, e.g. by recognising that one type of property is generally returned more quickly from one tree rather than another. Additionally or alternatively, a flag can be included at a node of one tree to indicate that a more reliable value for an attribute can be obtained using a different tree. The flag might identify the other tree or trees that can be used to obtain the more reliable value.

Many other fields are present in the header of the HTTP request and can be treated in this tree based way. Similarly, strings other than those found in the header of the HTTP request might be used, such as an International Mobile Equipment Identity (IMEI) code.

Other variations and modifications will be apparent to the skilled person. In particular, the retrieval of device properties may not be in the context of a request for content from a Web server 2. Instead, the properties of devices identified from a log might be retrieved for analysis. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A method of determining a property for a subject communication device by one or more electronic devices, which subject communication device has a string of characters associated with it, the method comprising:

providing a store of previously identified properties of sample communication devices in which the previously identified properties in the store are referenced by nodes of a tree of sample strings of characters similarly associated with the sample communication devices, and the tree is structured in accordance with the characters of the sample strings of characters such that nodes of the tree comprise consecutive substrings common to the sample strings of characters of more than one of the sample communication devices;

receiving the string of characters associated with the subject communication device;

using the string of characters associated with the subject communication device to retrieve a property from the store of previously identified properties of sample communication devices by sequentially comparing the string of characters associated with the subject communication device to the tree of sample strings of characters associated with the sample communication devices until the node of the tree by which the property is referenced in the store is found, then reading that property from the store; and wherein nodes are flagged when there is a later node along the tree that references the same property with a different value, and when the node that is found has a flag, then continuing to compare the string of characters associated with the subject communication device to the tree of sample strings of characters associated with the sample communication devices until a node of the tree by which the selected property is referenced in the store without a flag is found, then reading the value of that property from the store.

2. The method of claim 1, wherein the string of characters associated with the subject communication device is included in a request sent by the subject communication device for content to be provided to it.

3. A method of providing content to a subject communication device over a communications system by one or more electronic devices, which subject communication device has a string of characters associated with it, the method comprising:

providing a store of previously identified properties of sample communication devices in which the previously identified properties in the store are referenced by nodes of a tree of sample strings of characters similarly associated with the sample communication devices, and the tree is structured in accordance with the characters of the sample strings of characters such that nodes of the tree comprise consecutive substrings common to the sample strings of characters of more than one of the sample communication devices;

receiving a request from the subject communication device for content to be provided to it, the request including the string of characters associated with the communication device;

determining a property for the subject communication device by using the string of characters associated with the subject communication device to retrieve the property from the store of previously identified properties of sample mobile devices by sequentially comparing the string of characters associated with the subject communication device to the tree of sample strings of characters associated with the sample communication devices until the node of the tree by which the property is referenced in the store is found, then reading that property from the store;

optimizing the content based on the retrieved property;

wherein nodes are flagged when there is a later node along the tree that references the same property with a different value, and when the node that is found has a flag, then continuing to compare the string of characters associated with the subject communication device to the tree of sample strings of characters associated with the sample communication devices until a node of the tree by which the selected property is referenced in the store without a flag is found, then reading the value of that property from the store.

4. The method of claim 1, wherein both the string of characters associated with the subject communication device and the sample strings of characters associated with the sample communication devices are user agent strings.

5. The method of claim 2, wherein the string of characters associated with the subject communication device is a field of the request indicating the type of content preferred by the communication device.

6. The method of claim 1, wherein the previously identified properties in the store are referenced by nodes of more than one tree of sample strings of characters, the type of sample strings of characters being different for different trees.

7. The method of claim 1, wherein each previously identified property is referenced by the first node along the tree common to the sample communication devices having that previously identified property.

8. The method of claim 1, wherein the substrings comprise multiple characters of the sample strings of characters.

9. The method of claim 8, wherein the substrings comprise serial parts of the sample strings of characters.

10. The method of claim 1, wherein no node of the tree has only one child node unless that child node that references a property.

11. The method of claim 1, wherein no node of the tree both has no children and does not reference a property.

12. The method of claim 1, wherein the properties comprise attributes that have values.

13. The method of claim 1, wherein the properties are provided in a look up table referenced by nodes of the tree.

14. The method of claim 1, wherein the tree comprises a serial code.

15. The method of claim 1, wherein the retrieving a property from the store comprises querying the tree with a function including the received string of characters.

16. A method of determining multiple properties for the subject communication device using the method of claim 1 to retrieve multiple previously identified properties from the store.

17. The method of claim 3, comprising determining multiple properties for the subject communication device by using the string of characters associated with the subject communication device to retrieve multiple previously identified properties from the store.

18. The method of claim 1, wherein the subject communication device is wireless.

19. The method of claim 1, wherein the content is a Web resource.

20. A computer program product adapted to carry out the method of claim 1 when processed by computer processing means.

21. Apparatus for determining a property of a communication device, the apparatus comprising a processor for carrying out the method of claim 1.

22. Apparatus for providing content to a user over a communications system, the apparatus comprising a processor for carrying out the method of claim 3.

23. A Web server comprising the apparatus of claim 22.

24. The method of claim 3, wherein the string of characters associated with the subject communication device is a field of the request indicating the type of content preferred by the communication device.

25. The method of claim 3, wherein the content is coded using Extensible HyperText Markup Language (XHTML).

26. A method of determining a property for a subject communication device by one or more electronic devices, which subject communication device has a string of characters associated with it, the method comprising:
   providing a store of previously identified properties of sample communication devices in which the previously identified properties are referenced by nodes of a tree of sample strings of characters similarly associated with the sample communication devices, the tree is structured in accordance with the characters of the sample strings of characters, and each previously identified property is referenced by the first node along the tree common to the sample communication devices having that previously identified property;
   receiving the string of characters associated with the subject communication device;
   using the string of characters associated with the subject communication device to retrieve a property from the store of previously identified properties of sample communication devices by sequentially comparing the string of characters associated with the subject communication device to the tree of sample strings of characters associated with the sample communication devices until the node of the tree by which the property is referenced in the store is found, then reading that property from the store; and
   wherein nodes are flagged when there is a later node along the tree that references the same property with a different value, and when the node that is found has a flag, then continuing to compare the string of characters associated with the subject communication device to the tree of sample strings of characters associated with the sample communication devices until a node of the tree by which the selected property is referenced in the store without a flag is found, then reading the value of that property from the store.

27. A method of determining a property for a subject communication device by one or more electronic devices, which subject communication device has a string of characters associated with it, the method comprising:
   providing a store of previously identified properties of sample communication devices in which the previously identified properties in the store are referenced by nodes of a tree of sample strings of characters similarly associated with the sample communication devices, and the tree is structured in accordance with the characters of the sample strings of characters with adjacent nodes comprising substrings that are consecutive parts of the sample strings of characters;
   receiving the string of characters associated with the subject communication device;
   using the string of characters associated with the subject communication device to retrieve a property from the store of previously identified properties of sample communication devices by sequentially comparing the string of characters associated with the subject communication device to the tree of sample strings of characters associated with the sample communication devices until the node of the tree by which the property is referenced in the store is found, then reading that property from the store; and wherein nodes are flagged when there is a later node along the tree that references the same property with a different value, and when the node that is found has a flag, then continuing to compare the string of characters associated with the subject communication device to the tree of sample strings of characters associated with the sample communication devices until a node of the tree by which the selected property is referenced in the store without a flag is found, then reading the value of that property from the store.

28. A method of determining a value of a property for a subject communication device by one or more electronic devices, which subject communication device has a string of characters associated with it, the method comprising:

provided a store of previously identified properties of sample communication devices in which the previously identified properties are referenced by nodes of a tree of sample strings of characters similarly associated with the sample communication devices, the tree is structured in accordance with the characters of the sample strings of characters, and each previously identified property is referenced by the first node along the tree common to the sample communication devices having that previously identified property;

selecting a property of the subject communication device for which to determine a value, using the string of characters associated with the subject communication device to retrieve a value of the selected property from the store of previously identified properties of sample communication devices by sequentially comparing the string of characters associated with the subject communication device to the tree of sample strings of characters associated with the sample communication devices until the node of the tree by which the selected property is referenced in the store is found, then reading the value of that property from the store; and wherein nodes are flagged when there is a later node along the tree that references the same property with a different value, and when the node that is found has a flag, then continuing to compare the string of characters associated with the subject communication device to the tree of sample strings of characters associated with the sample communication devices until a node of the tree by which the selected property is referenced in the store without a flag is found, then reading the value of that property from the store.

29. A method of determining a value of a property for a subject communication device by one or more electronic devices, which subject communication device has a string of characters associated with it, the method comprising:

providing a store of previously identified properties of sample communication devices in which the previously identified properties in the store are referenced by nodes of a tree of sample strings of characters similarly associated with the sample communication devices, and the tree is structured in accordance with the characters of the sample strings of characters;

selecting a property of the subject communication device for which to determine a value, using the string of characters associated with the subject communication device to retrieve a value of the selected property from the store of previously identified values of properties of sample communication devices by sequentially comparing the string of characters associated with the subject communication device to the tree of sample strings of characters associated with the sample communication devices until a node of the tree by which the selected property is referenced in the store is found, wherein nodes are flagged when there is a later node along the tree that references the same property with a different value, and when the node that is found has a flag, then continuing to compare the string of characters associated with the subject communication device to the tree of sample strings of characters associated with the sample communication devices until a node of the tree by which the selected property is referenced in the store without a flag is found, then reading the value of that property from the store.

* * * * *